Patented June 17, 1930

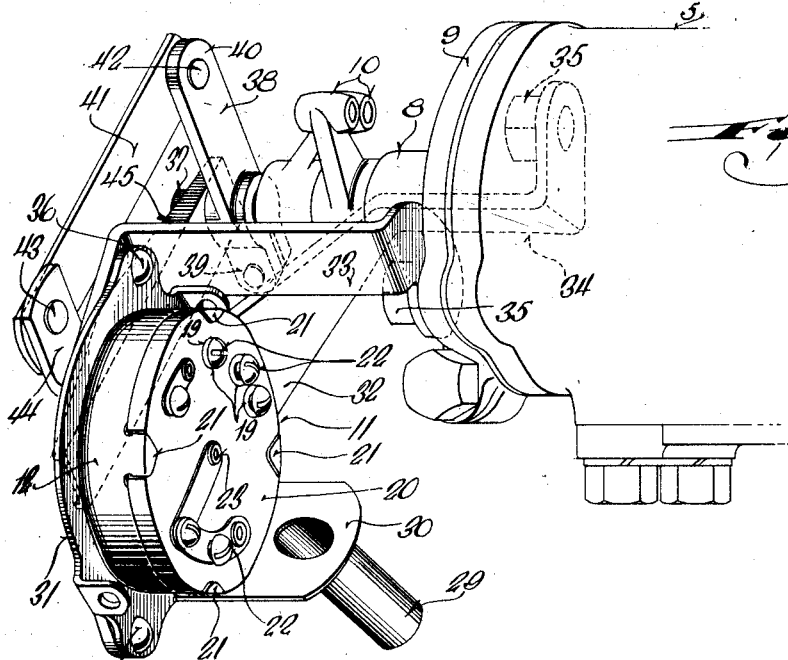

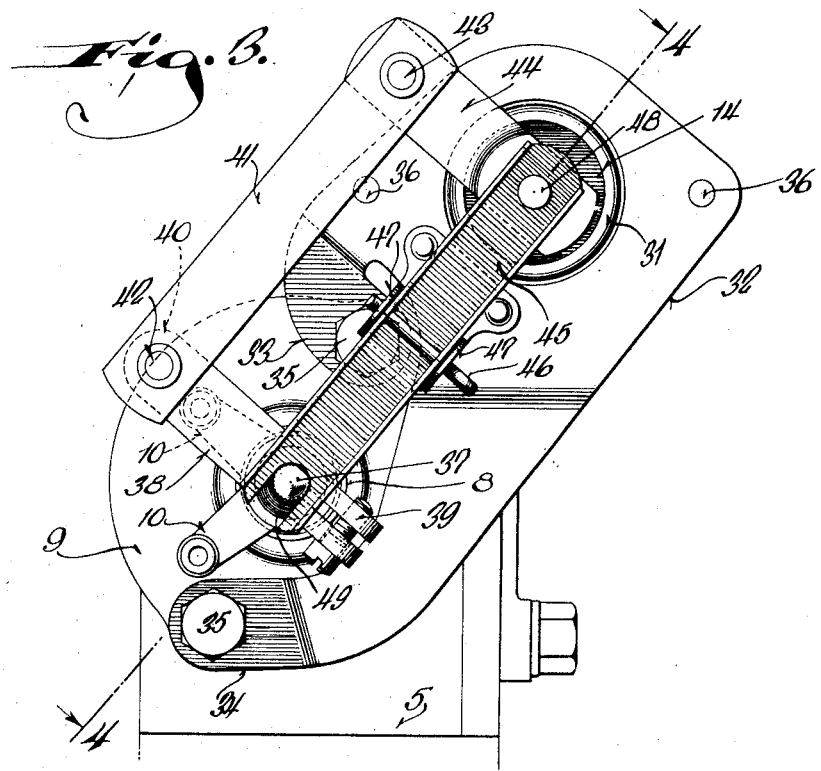
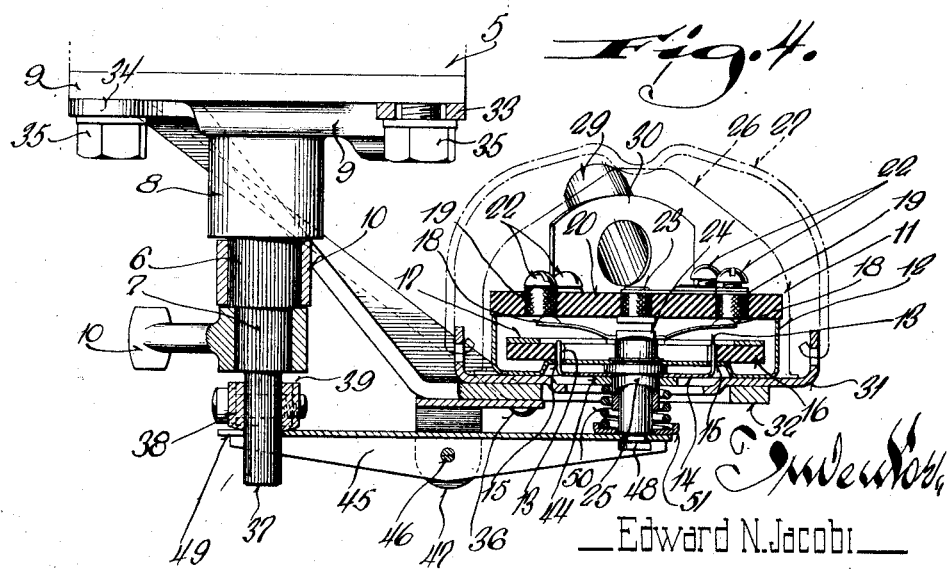

1,764,169

UNITED STATES PATENT OFFICE

EDWARD N. JACOBI, OF MILWAUKEE, WISCONSIN, ASSIGNOR TO BRIGGS & STRATTON CORPORATION, OF MILWAUKEE, WISCONSIN, A CORPORATION OF WISCONSIN

STEERING-COLUMN SWITCH

Application filed May 13, 1927. Serial No. 191,081.

This invention relates to certain new and useful improvements in steering column switches of the type adapted to be mounted adjacent the base of the column and actuated from a point at the upper end of the column, as at length described and illustrated in my copending application, filed May 13, 1927, Serial No. 191,080.

It is an object of this invention to provide a simplified mounting means for a switch of the character described wherein the switch may be set to one side of the steering column rather than in line therewith to facilitate its installation on vehicles having a restricted space at the lower end of the steering column.

A further object of this invention resides in the provision of an improved bracket means for mounting the switch from the steering column gear casing which will conveniently locate the switch for the purpose of installation and repairs and which will maintain the same rigid.

A further object of this invention resides in the provision of an improved switch mechanism of the character described having a rocker arm adapted to be moved on its pivot to close one contact when the actuating member is depressed and a link arrangement for rotating the switch spring contact carrying member to actuate the switch mechanism proper when the actuating member is rotated.

And a still further object of this invention resides in the provision of an improved switch cover having one side closed by a conduit guard to permit ready access to the interior thereof.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a perspective view of the lower portion of a steering column gear illustrating my improved switch mechanism as applied to the gear casing thereof;

Figure 2 is a side elevational view of the lower portion of the steering column gear casing and the switch mechanism;

Figure 3 is an end plan view of the switch mechanism, and

Figure 4 is a view, partly in side elevation and partly in transverse section, taken through Figure 3 on the plane of the line 4—4.

Referring now more particularly to the accompanying drawings, in which like numerals designate like parts throughout the several views, 5 designates the gear casing at the lower end of a vehicle steering gear column, which, as described at length in the copending application above referred to, has gas and spark control tubes 6 and 7 mounted therein with their lower ends projected beyond the boss 8 on the cap or end 9 of the gear housing and carrying levers 10 adapted to be connected with the various controls in a conventional manner.

Supported from the gear casing or housing 5, in the manner later described, and adapted to be controlled from the upper end of the steering column, in the manner described in my copending application above referred to, is a switch mechanism 11 consisting of a casing or housing 12 having the driving tongues or lugs 13 of a contact driver member 14 projected thereinto through arcuate slots 15 and drivingly engaged with a fibre contact disk 16 with which a contact support 17 is connected. The contact support 17 carries suitable spring contact fingers 18 adapted to bridge the terminals or contacts 19 of a terminal carrying head 20 which closes the outer end of the housing and is secured in place by lugs or tongues 21 struck thereover, terminal screws 22 facilitating the connection therewith of the wires combined in a cable 28.

The terminals 19 are connected with the various circuits of the vehicle and a centrally located terminal 23 carried by the head is generally connected with the horn circuit and is engageable by a movable contactor or pin 24 slidable within the tubular shank 25 of the driver member 14, the pin being actuated in the manner later described. A suitable cover 26, preferably stamped from sheet metal, encloses the switch assembly and the wires connected with the terminals 22 and is movably secured in place by a bail 27, in the manner best shown in Figures 2 and 4. The cable 28 enclosing the conductors enters the interior of the housing 26 through a tubular conduit 29 carried by an upstanding tongue portion 30 of a base 31 to which the switch is suitably secured, the cover having one side slotted through which the wires pass, which slot is closed by the portion 30.

The entire switch assembly is rigidly mounted from the steering gear to one side of the housing or casing 5 by a bracket structure 32 which is preferably stamped from one piece and has two attaching arms 33 and 34 bent to engage the cap 9 of the gear housing at opposite sides of the boss 8 to be secused in place by the bolts 35 securing the cap in position. The outer end of the bracket structure is substantially flat to receive the switch mechanism base member 31 which is riveted or otherwise secured thereto, as at 36. The switch mechanism is thus rigidly mounted to one side of the lower end of the steering column with its axis, as defined by the axis of the driver member, substantially parallel to that of the steering column.

Slidably mounted within the innermost tube of the steering column is an actuating tube or rod member 37 the upper end of which is connected with control mechanism, not shown, of a nature similar to that illustrated in my copending application above referred to and the lower end of which projects beyond the tube 7 and has a lever 38 adjustably secured thereto, as at 39, the outer end 40 of the lever having one end of a link 41 pivotally connected therewith, as at 42, the other end of said link being pivotally connected at 43 with the outer end of a lever 44 having its inner end apertured to receive the shank 25 of the driver member to which it is secured so that rotation of the actuating tube or rod member 37 is imparted to the driver member 14 through the link arrangement described.

As described in my copending application above referred to, the member 37 is shifted longitudinally in the steering column when it is desired to close the circuit in which the contact 23 is included, the pin 24 being actuated by a rocker arm 45 medially pivoted at 46 between a pair of spaced upstanding lugs or tongues 47 fixed to the bracket 32.

One end of the arm 45 is connected at 48 with the pin 24 and its other end is slotted at 49 to receive the end of the member 37 projected beyond the lever 38, the lever bearing against the arm to rock the same when member 37 is shifted inwardly to move the pin 24 into engagement with the terminal 23. Release of pressure on the member 37 permits its retraction by its spring means, not shown and illustrated in my copending application above referred to, and the pin 24 and the rocker arm are likewise moved to follow the member 37 by a spring 50 compressed between the adjacent end of the lever 45 and a cup-shaped washer 51 bearing against the rocker arm.

From the foregoing description taken in connection with the accompanying drawing, it will be readily apparent to those skilled in the art to which an invention of the character described appertains that the improved structure illustrated permits the ready and convenient mounting of a switch mechanism at the lower end of the steering column to eliminate the use of unnecessarily long stretches of wire and which is so located as to permit its easy installation and access thereto for the purpose of repair.

What I claim as my invention is:

1. A switch mechanism, comprising a terminal carrying head, terminals on said head, a movable contactor engageable with one terminal of the head, a second contactor engageable with another of the terminals, a rocker arm connected with one contactor and adapted, upon rocking movement, to actuate the same, a rotatable and slidable actuating member axially off-set with respect to the terminal carrying head and its cooperating contactors, connections between the actuating member and rocker arm whereby shifting thereof actuates the rocker arm, and means connecting the actuating member with the other contactor whereby rotation of the actuating member actuates the said other terminal.

2. The combination with the steering gear of a motor vehicle and the switch mechanism thereof including a terminal carrying head, terminals carried by the head, a contactor engageable with the terminals, another terminal carried by the head and a second contactor engageable with the last terminal, of means mounting the switch mechanism to one side of the steering gear, and means operable from said steering gear to actuate the respective contactors.

3. The combination with the steering gear of a motor vehicle and the switch mechanism thereof including a terminal carrying head, terminals carried by the head, a contactor engageable with the terminals, another terminal carried by the head and a second contactor engageable with the last terminal, of a bracket member securing the switch mechanism to the steering gear but offset with respect to the axis thereof, and means operable from said steering gear to actuate the respective contactors.

4. The combination with a switch mechanism including a plurality of terminals, a movable contactor engageable with certain of said terminals and a second contactor engageable with another of the terminals, of a switch actuating member mounted for movement in two planes, said switch actuating member being axially off-set with respect to the movable contactors, means connecting the actuating member with the first contactor whereby movement of the actuating member in one direction engages said contactor with its terminals, and means connecting the acuating member with the second contactor whereby movement of the actuating member in another plane engages said contactor with its terminal.

5. The combination with a switch mechanism including a plurality of terminals, a movable contactor engageable with certain of said terminals, upon movement in one plane, and a second contactor engageable with another of the terminals upon movement in another plane, of a switch actuating member mounted for movement in either of two planes, said switch member being axially off-set with respect to the switch mechanism, link means connecting the actuating member with the first contactor whereby movement of the actuating member in one plane engages said contactor with its terminals, and means connecting the actuating member with the other contactor whereby movement of the actuating member in another plane engages said contactor with its terminal.

6. The combination with a switch mechanism including a plurality of terminals, a movable contactor engageable with certain of the terminals, and a second contactor engageable with another of the terminals, of a switch actuating member mounted for movement in two planes, said switch actuating member being axially off-set with respect to the contactors, link means connecting the actuating member with the first contactor whereby movement of the actuating member in one direction engages said contactor with its terminals, and means including a rocking lever connecting the actuating member with the other contactor whereby movement of the actuating member in another plane engages said contactor with its terminal.

7. The combination with the steering gear of an automotive vehicle having a gear casing at the lower portion thereof provided with an end plate member and bolt means securing the plate member in place and a switch mechanism including two movable contactors adapted for operation in different planes, of mounting bracket means for securing the switch mechanism to the steering column by the plate bolt means to one side of the steering gear axis, and means connected with the contactors to operate the same.

8. In combination with a hollow steering column and a rod slidably and rotatably mounted therein, switch mechanism including a plurality of terminals, a rotatable contactor engageable with certain of the terminals and a reciprocal contactor engageable with the other of the terminals, means mounting the switch mechanism axially off-set with respect to the steering column, a lever connected with the rod, a lever connected with the rotatable contactor, means connecting the levers whereby rotation of the rod actuates the rotatable contactor through said levers and their connecting means, a rocking lever medially pivotally mounted between said first levers, and means whereby axial sliding of the rod rocks said rocking lever to actuate the reciprocal contactor.

9. In combination with a hollow steering column and a rod slidably and rotatably mounted therein, switch mechanism including a plurality of terminals, a rotatable contactor engageable with certain of the terminals and a reciprocal contactor engageable with the other of the terminals, means mounting the switch mechanism axially off-set with respect to the steering column, a lever connected with the rod, a lever connected with the rotatable contactor, a link connecting the levers whereby rotation of the rod actuates the rotatable contactor through said levers and their connecting means, a rocking lever medially pivotally mounted between said first levers, spring means acting on the rocking lever to oppose sliding movement of the rod, and means whereby axial sliding of the rod rocks said rocking lever to actuate the reciprocal contactor.

10. The combination with a switch mechanism including a pair of movable contactors one of which is rotatable and the other mounted for axial movement, of means for selectively actuating the movable contactors and including a rod slidably and rotatably mounted, a medially pivoted lever connecting the movable contactor having axial movement with the rod to transfer axial movement of the rod to said movable contactor, the connection of said lever with the rod being uneffected by rotation of the rod, and lever means connecting the rod with the other movable contactor to impart rotation to said movable contactor upon rotation of the rod.

In testimony whereof, I hereunto affix my signature.

EDWARD N. JACOBI.